UNITED STATES PATENT OFFICE.

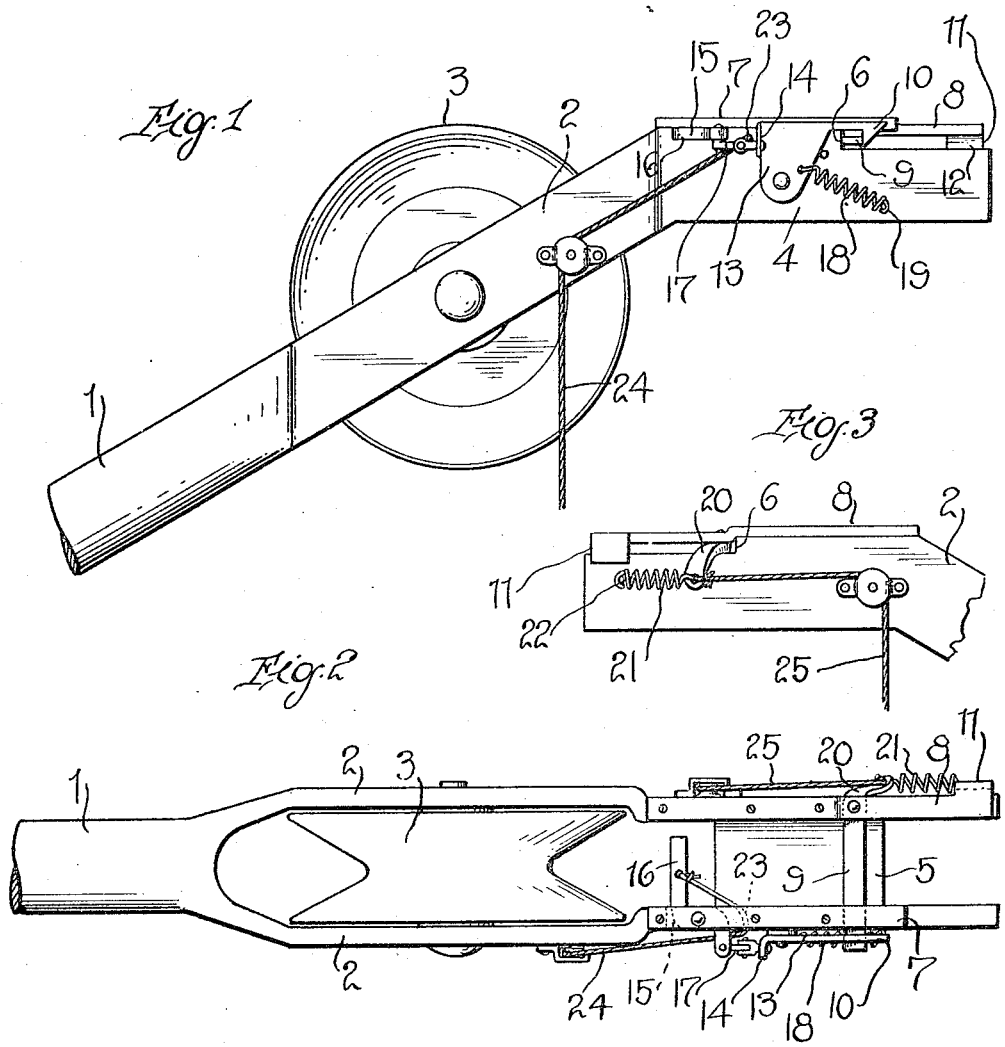

JOSEPH C. HANSON, OF MOVILLE, IOWA.

TROLLEY-WHEEL GUARD.

1,124,428. Specification of Letters Patent. Patented Jan. 12, 1915.

Application filed June 20, 1914. Serial No. 846,350.

*To all whom it may concern:*

Be it known that I, JOSEPH C. HANSON, a citizen of the United States, residing at Moville, in the county of Woodbury and State of Iowa, have invented certain new and useful Improvements in Trolley-Wheel Guards, of which the following is a specification, reference being had to the accompanying drawings.

This invention relates to new and useful improvements in trolley wheel attachments and more particularly to a guard for retaining the wire in normal engagement with the trolley wheel, the main object of the present invention being the provision of a guard device whereby the trolley wheel may be readily engaged and disengaged from the wire and, at the same time securely retained in normal engagement with the wire when in use and also to provide means whereby the guard may be readily actuated to allow the same to pass over the wire connections at various points along the wire.

Another object of the present invention is the provision of a trolley guard of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a side elevation, illustrating a trolley guard constructed in accordance with my invention. Fig. 2 is a top plan view; and Fig. 3 is a detail enlarged side elevation.

Referring more particularly to the drawing, 1 indicates a trolley pole, the upper end of which is bifurcated to form the spaced ears 2, between which the trolley wheel 3 is mounted for rotation. Extending outwardly from the upper ends of the ears 2, are the spaced supporting arms 4, which are connected at their lower longitudinal edges by means of the transverse member 5, so as to securely retain said arms against spreading movement. The supporting arms 4 are cut-away at their outer ends to form the shoulders 6 and secured to the upper longitudinal edges of the supporting arms are the metal plates 7 and 8, the outer end of the plate 7 projecting beyond the shoulder and arranged in spaced relation with the offset portion. The plate 8 is offset at the shoulder 6 and pivotally mounted between the arm and the offset portion of the plate is a retaining bar 9, the free end of which is adapted to be arranged beneath the end of the plate 7 and engaged by means of a hook member 10. The outer end of the plate 8 is provided with a tongue 11 which is bent upon itself to form a stop 12 for the free end of the bar 9, when swung to an open position.

Pivotally mounted upon the outer side of one of the arms 4, is a plate 13, the upper edge of which is provided with the downwardly projecting hook 10, while a perforated angularly disposed hook 14 is formed opposite the hook member 10. The hook member 10 is adapted to normally engage the free end of the bar 9 to retain the same in its closed position, said bar being normally disposed transversely across the space between the plates 7 and 8. One of the supporting arms 4 is provided adjacent its rear end with a recess 15 in which is pivotally mounted an actuating bar 16, the inner end of which projects inwardly between the plates 7 and 8 and is adapted to be engaged by the connecting bars between the line wires and as the outer end of the bar 16 is connected to the lug 14 by means of the link 17, it will actuate the hook member 10 and release the free end of the bar 9, so that the connecting bars can readily pass between the supporting arms.

The hook 10 is retained in its normal effective position by means of the coil springs 18, one end of which is secured to the body of the plate 13, while the other end thereof is secured to an eye 19 formed upon the outer side of one of the arms 4. The pivoted end of the bar 9 is provided with a downwardly turned perforated lug 20 to which a coil spring 21 is secured, the other end of said coil spring being connected to an eye 22 on the outer side of one of the arms 4, whereby to return the bar 9 to its normally closed position. Connected with the inner end of the arm 16 and extending outwardly through an opening 23 in the arm 4, is a cord 24 which is adapted to extend downwardly to the body of the trolley guard, whereby said arm may be actuated to release the hook member 10 when it is desired to disengage the wheel 3 from the trolley wire.

Secured to the hook 20 and extending rearwardly along the side of one of the arms 4, is a cord 25, which is adapted to extend downwardly to the rear of the trolley guard, whereby upon downward pulling movement upon this cord, the bar 9 may be moved to an open position to allow the wheel to be removed from the trolley wire.

From the foregoing it will be apparent that I have provided a simple and durable trolley guide whereby the wheel 3 may be quickly and readily detached from the wire or applied thereto and which, at the same time provides means whereby the wheel may readily pass over the wire connections and again engage the trolley wire upon the opposite side of the connection to engage the wheel with the wire. It will also be apparent that my improved trolley guard is extremely simple in construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the class described including a trolley pole, supporting arms secured to the outer end thereof and arranged in spaced relation, a pivoted bar extending transversely between said supporting arms, a pivoted hook carried by one of said arms and adapted to engage the free end of the transverse bar to retain the same in its normal position, said hook member being actuated by the connecting members of the line wires to disengage the hook from the bar and permit swinging movement of said bars, as and for the purpose set forth.

2. A device of the class described including a trolley pole, supporting arms secured to the outer end thereof and arranged in spaced relation, a transverse bar having one end pivoted to one of the supporting arms and adapted to normally extend transversely between said arms, a pivoted hook member carried by the other of said supporting arms and adapted to engage the free end of the pivoted bar to retain the same in its normal position, said hook member being actuated by the connecting members of the line wires, whereby to disengage the same from the bar, said bar being also actuated by the connecting members whereby to extend the same in a position longitudinally of the supporting arms, and means for returning said transverse bar to its normal position.

3. A device of the class described including a trolley pole, spaced supporting arms secured to the outer end thereof, a pivoted retaining bar carried thereby and extending transversely across the space between said arms, a pivoted hook member carried by one of said arms and adapted to engage the free end of the retaining bar, a pivoted bar carried by one of said arms, a link connecting one end of said pivoted bar with one end of the hook member, and the other end of said pivoted bar extending inwardly between the spaced arms, the inner end of said pivoted bar being adapted to be engaged by the connecting members of the line wires to actuate the same and release the hook member, said connecting members also engaging the retaining bar to swing the same to a longitudinal position, and means including a coil spring for returning said pivoted bar to its effective position.

4. A device of the class described including a trolley pole, supporting arms secured to the outer end thereof and arranged in spaced relation to receive the line wire therebetween, a pivoted bar carried by one of the arms and adapted to normally extend transversely across the space between the arms above the wire, a pivoted hook member adapted to engage one end of said bar to retain the same in its normal position, and means adapted to be actuated by the connecting members of the line wire, whereby to actuate said hook member and release the pivoted bar, as and for the purpose set forth.

5. A device of the class described including a trolley pole, spaced supporting arms secured to the outer end thereof and adapted to receive the line wire therebetween, a pivoted bar carried by one of said arms and normally extending transversely across to the other arm, a hook member carried by the opposite arm and adapted to normally retain said bar in its effective position, means adapted to be actuated by the connecting members of the line wire to release said bar, said bar being adapted to be engaged by the connecting members and moved to a longitudinal position, and a spring member connected to one end of the pivoted bar, whereby to return the same to its normal position.

In testimony where of I hereunto affix my signature in the presence of two witnesses.

JOSEPH C. HANSON.

Witnesses:
   FRED PARKE,
   ANNA CAMPBELL.

Copies of this patent may be obtained for five cents each, by addressing the "Commissioner of Patents, Washington, D. C."